No. 791,330. PATENTED MAY 30, 1905.
J. M. DODGE.
PROCESS OF RIVETING.
APPLICATION FILED JAN. 16, 1904.
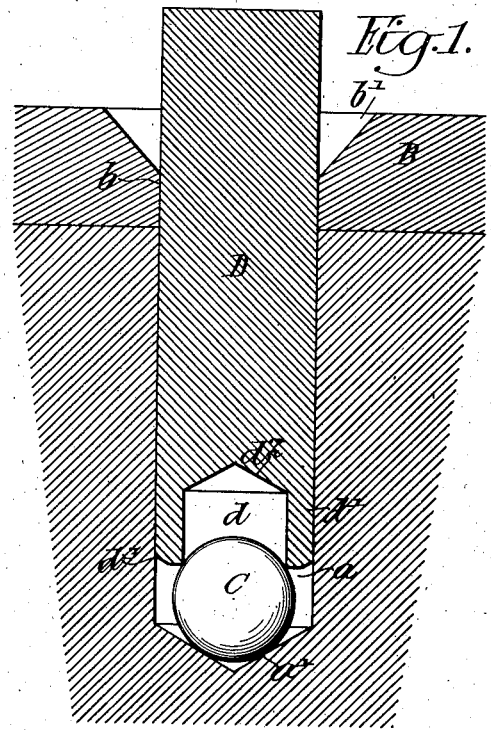
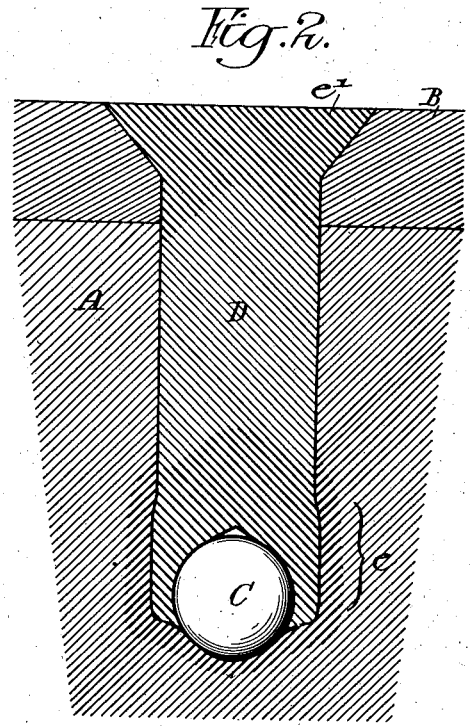
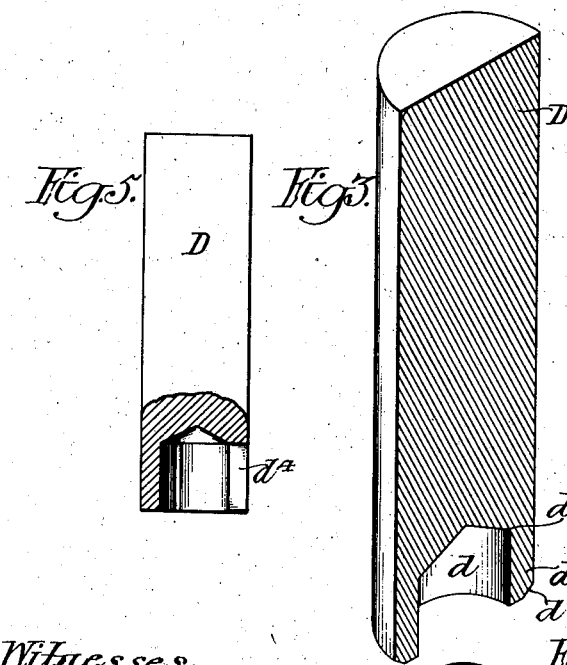
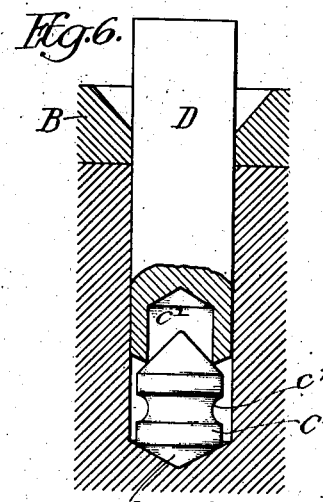
Witnesses
Wesley H. Reel
Titus H. Irons
Inventor:
James M. Dodge,
by his Attorneys No. 791,330.

Patented May 30, 1905.

UNITED STATES PATENT OFFICE.

JAMES M. DODGE, OF PHILADELPHIA, PENNSYLVANIA.

PROCESS OF RIVETING.

SPECIFICATION forming part of Letters Patent No. 791,330, dated May 30, 1905.

Application filed January 16, 1904. Serial No. 189,326.

*To all whom it may concern:*

Be it known that I, JAMES M. DODGE, a citizen of the United States, residing in Philadelphia, Pennsylvania, have invented certain Improvements in Processes of Riveting, of which the following is a specification.

The object of my invention is to form a head simultaneously on each end of the rivet, as fully described hereinafter.

My invention is applicable to that class of rivets which are used as substitutes for stud-bolts where the rivet passes entirely through one object and extends into a cavity in another object, and the rivet is so made that when a head is formed on one end of the rivet by a blow or by pressure a head will be formed on the opposite end of the rivet within the cavity.

In the accompanying drawings, Figure 1 is a sectional view showing the rivet in position to be driven into place. Fig. 2 shows a rivet driven in place. Fig. 3 is a sectional perspective view of one form of rivet which I prefer to use. Fig. 4 is a view of a ball, being one form of expander. Figs. 5 and 6 are views of modifications of the invention.

I will describe my invention in connection with a rivet which is to be used for securing a plate onto a metallic body.

A is the metallic body, and B is the plate. The plate has a hole $b$ passing entirely through it and is countersunk at $b'$ in the present instance.

$a$ is a hole in the metallic body extending to any depth required and preferably having a conical base $a'$. Within the hole is placed an expander C, in the present instance in the form of a ball.

D is a rivet-blank having a recess $d$ in one end, forming an annular flange $d'$. The base $d^2$ of the recess is conical. The recess in the end of the rivet is somewhat less in diameter than the ball, and the end of the rivet is preferably beveled at $d^3$. The rivet-blank is of such a length that when it is in position resting on the expander it will extend above the surface of the plate B, as indicated in Fig. 1. When the rivet is headed by either hammering or by pressure, both ends of the rivet will be headed simultaneously, the flange at the lower end will be forced over the ball, enlarging the hole $a$ at the base and condensing the metal around the hole, as indicated in Fig. 2, at the same time the metal of the rivet is also condensed, forming a head $e$ at the lower end simultaneously with forming a head $e'$ at the upper end. The flange $d'$ of the rivet will be forced under the ball, as indicated in Fig. 2, so that it will be locked thereto, and as the hole has been enlarged and the head formed on the inner end of the rivet it will be very difficult to withdraw the rivet, owing to the fact that it is firmly attached to the expanding-ball.

Different forms of expanders may be used—such, for instance, as that illustrated in Fig. 6, which illustrates an expander C', having conical ends $c$ $c'$ and an annular recess $c^2$. The shape of the recessed end of the rivet may also be modified without departing from my invention—for instance, the flange may be made up of a series of segments $d^4$, as shown in Fig. 5, and may be flat on the end in some instances.

I have illustrated in a companion application filed April 10, 1903, Serial No. 151,990, for improvements in expansion rivets and bolts, several forms of expanders and modified forms of rivets which can be used in carrying out my invention.

I claim as my invention—

1. The process herein described of forming heads simultaneously on each end of a rivet-blank, said process consisting in first forming a hole entirely through one object and partly through another object, placing a loose expander in the hole in advance of the rivet, hammering or pressing the exposed end of the rivet-blank so as to simultaneously form a head on each end of the rivet-blank, the expander causing the metal of the rivet-blank to condense the metal in which the hole is made, whereby the hole is enlarged at this point so as to prevent the withdrawal of the rivet-blank, substantially as described.

2. The process herein described of riveting, said process consisting in making a hole entirely through one object and partly through another object, the hole in the latter object being an even diameter throughout, providing a rivet-blank with a recess in one end and an expander, the expander being less in diameter than the rivet-blank but greater in diameter than the recess in the blank, inserting the expander and rivet-blank in the hole, then hammering or pressing the exposed end of the rivet-blank so as to simultaneously enlarge both ends of the rivet to form heads, the head on the inner end of the rivet-blank enlarging the hole and condensing the metal, substantially as described.

In testimony whereof I have signed my name to this specification in the presence of two subscribing witnesses.

JAMES M. DODGE.

Witnesses:
 WILL. A. BARR,
 JOS. H. KLEIN.